Apr. 17, 1923.

J. L. DONAT 1,452,293

RESILIENT TIRE

Filed Dec. 26, 1919

Inventor:
Joseph L. Donat,
By Foree Bain & Hinkle
Attys

Patented Apr. 17, 1923.

1,452,293

UNITED STATES PATENT OFFICE.

JOSEPH L. DONAT, OF CHICAGO, ILLINOIS.

RESILIENT TIRE.

Application filed December 26, 1919. Serial No. 347,259.

*To all whom it may concern:*

Be it known that I, JOSEPH L. DONAT, a citizen of the United States, residing at Chicago, in the county of Cook and State of Illinois, have invented certain new and useful Improvements in Resilient Tires, of which the following is a specification.

This invention relates to improvements in resilient wheels.

One of the objects of the invention is to provide improved means for holding a pneumatic tire and an overlying cushion tire, or tread, together.

Another object is to provide a single one-part rim structure to which the tires of both types are attached.

Another object is to provide a transversely central, inwardly extending part of the rim, to directly support the pneumatic tube within the casing, said inwardly extending part having outwardly and laterally projecting flanges for support of the resilient side members of the two-part casing.

Other, further and more specific objects of the invention will become readily apparent to persons skilled in the art, from a consideration of the following description when taken in conjunction with the drawings, wherein:—

In both views the same reference characters are employed to indicate similar parts.

Figure 1:
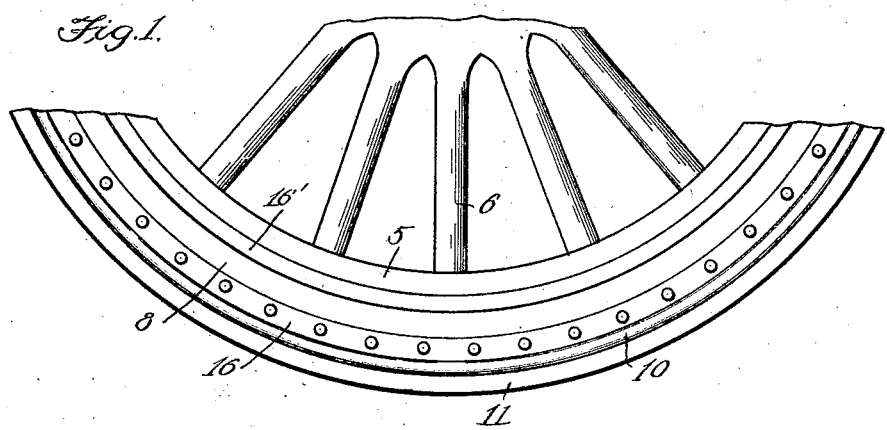
Fig. 1 shows a fragmentary elevation of a wheel having my improved structure.

The usual felly 5 is secured to the spokes 6 and a regular standard U shaped rim 7 is fixed to the felly. The outer casing of the tire is composed of the resilient fabric side members, or rings, 8 and 9, one on each side of the median diametric plane of the felly and secured to the rim 7 in the usual manner by outwardly extending arms 16' and 16'a. An outer rim 10 secures a cushion tire or tread 11 in place. Secured to the inner surface of the rim 10 is an auxiliary rim 12 having laterally extending base portions 13 for support of the side members 8 and 9, and having an inwardly extending portion 14 for support of the inner tube 15. Side rings 16, one of which is placed on each side of the members 8 and 9 and bolts 17 pass thru the rings 16 and thru the auxiliary rim 12, as clearly shown in Fig. 2. The rim 12 may be spotwelded or brazed to the rim 10, or otherwise fixed thereto.

Figure 2:
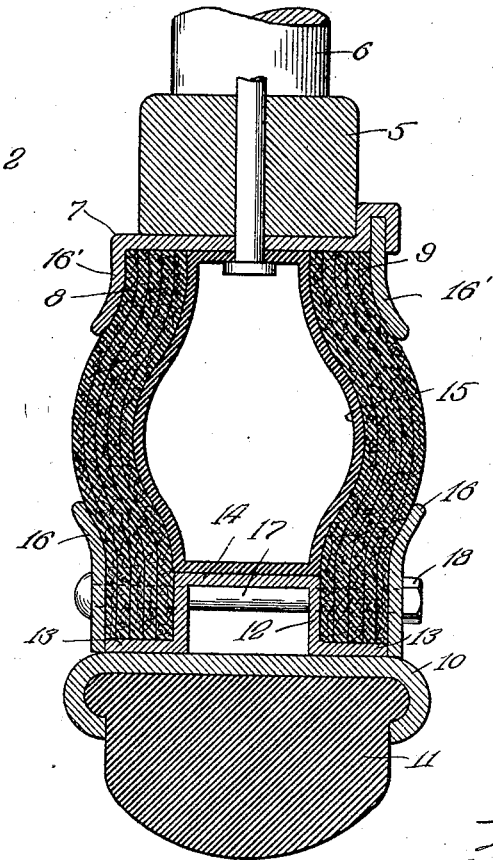
Fig. 2 is an enlarged section thru the circumferentially extending portion of the wheel.

When the nuts 18 are removed from the ends of the bolts 17, the side rings 16 and 16'a may be taken away whereupon the flexible side member 9 may be removed so that the inner tube 15 can be taken out of the composite casing. When the inner tube is replaced and inflated, the mid-portions of the rings 8 and 9 are laterally extended by the pressure within the tube 15, as shown in Fig. 2.

This wheel is especially adapted for heavy vehicles, such as trucks, and the like. It is a cheap tire to build because the flat rings 8 and 9 are made simply of flat pieces of fabric without the necessity of providing separate molds within which to form them.

Having described my invention, what I claim is new and desire to secure by Letters Patent is:—

A resilient wheel having in combination a two part casing provided by two like normally flat resilient rings, each ring consisting of a plural ply fabric of uniform thickness throughout; a rim to hold the inner edges in place, having flanges of uniform thickness; an outer rim having an inwardly extending abutment, comprising a channel opening outwardly, to support the inner tube and to overlie the outer edges of the flexible rings; flanges engaging the outer surfaces of the flexible flat rings and bolts passing thru both flanges, both rings and the channel structure to hold the assembled parts together.

In testimony whereof I hereunto subscribe my name.

JOSEPH L. DONAT.